(12) United States Patent
Kanazawa

(10) Patent No.: US 10,040,197 B2
(45) Date of Patent: Aug. 7, 2018

(54) CONTROL DEVICE FOR MOBILE ROBOT

(71) Applicant: HONDA MOTOR CO., LTD., Tokyo (JP)

(72) Inventor: Masao Kanazawa, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 196 days.

(21) Appl. No.: 15/274,118

(22) Filed: Sep. 23, 2016

(65) Prior Publication Data

US 2017/0165836 A1  Jun. 15, 2017

(30) Foreign Application Priority Data

Dec. 14, 2015 (JP) ................. 2015-243184

(51) Int. Cl.
| | |
|---|---|
| *B25J 9/16* | (2006.01) |
| *B62D 57/02* | (2006.01) |
| *B25J 9/00* | (2006.01) |
| *B25J 13/08* | (2006.01) |
| *G05D 1/02* | (2006.01) |
| *G01L 5/00* | (2006.01) |
| *B62D 57/032* | (2006.01) |

(52) U.S. Cl.
CPC .......... *B25J 9/1669* (2013.01); *B25J 9/0006* (2013.01); *B25J 9/1633* (2013.01); *B25J 13/088* (2013.01); *B62D 57/02* (2013.01); *G05D 1/021* (2013.01); *B62D 57/032* (2013.01); *G01L 5/0028* (2013.01); *G05B 2219/39182* (2013.01); *Y10S 901/01* (2013.01)

(58) Field of Classification Search
CPC ...... B25J 13/088; B25J 9/0006; B25J 9/1669; B25J 9/1633; B25J 13/085; G05B 2219/39182; G05B 2219/37498; G05B 2219/41005; G05B 2219/41006; G05B 2219/41021; G05B 2219/41025; G05B 2219/41163; G05D 1/021; Y10S 901/01; B62D 57/02; G01L 5/0028

See application file for complete search history.

(56) References Cited

U.S. PATENT DOCUMENTS

| | | | | |
|---|---|---|---|---|
| 7,496,428 | B2 * | 2/2009 | Takenaka .............. | B62D 57/02 318/568.1 |
| 8,504,208 | B2 * | 8/2013 | Orita .................... | B25J 9/1664 700/245 |
| 2004/0143369 | A1 * | 7/2004 | Takenaka ............. | B62D 57/032 700/245 |

(Continued)

FOREIGN PATENT DOCUMENTS

JP  2005-052968  3/2005

*Primary Examiner* — Jason Holloway
(74) *Attorney, Agent, or Firm* — Rankin, Hill & Clark LLP

(57) ABSTRACT

A control device 40 for a mobile robot 1 converts a moment manipulated variable ↑τ_dmd determined in accordance with a deviation between a desired value and an observed value of a predetermined state quantity of the mobile robot 1 to a rotation manipulated variable ↑Δθ by which contacting portions 13, 23 of a plurality of movable links 3, 4 to be brought into contact with an external object are to be rotated about a desired ZMP, and corrects a desired position/posture of each contacting portion 13, 23 to a position/posture rotated about the desired ZMP by the rotation manipulated variable ↑Δθ.

4 Claims, 4 Drawing Sheets

(56) References Cited

U.S. PATENT DOCUMENTS

2006/0247799 A1* 11/2006 Takenaka ............. B62D 57/032
　　　　　　　　　　　　　　　　　　　　　　700/54
2007/0152620 A1* 7/2007 Takenaka ............... B25J 13/085
　　　　　　　　　　　　　　　　　　　　　　318/568.13
2012/0259463 A1* 10/2012 Orita ...................... B25J 9/1648
　　　　　　　　　　　　　　　　　　　　　　700/245

* cited by examiner

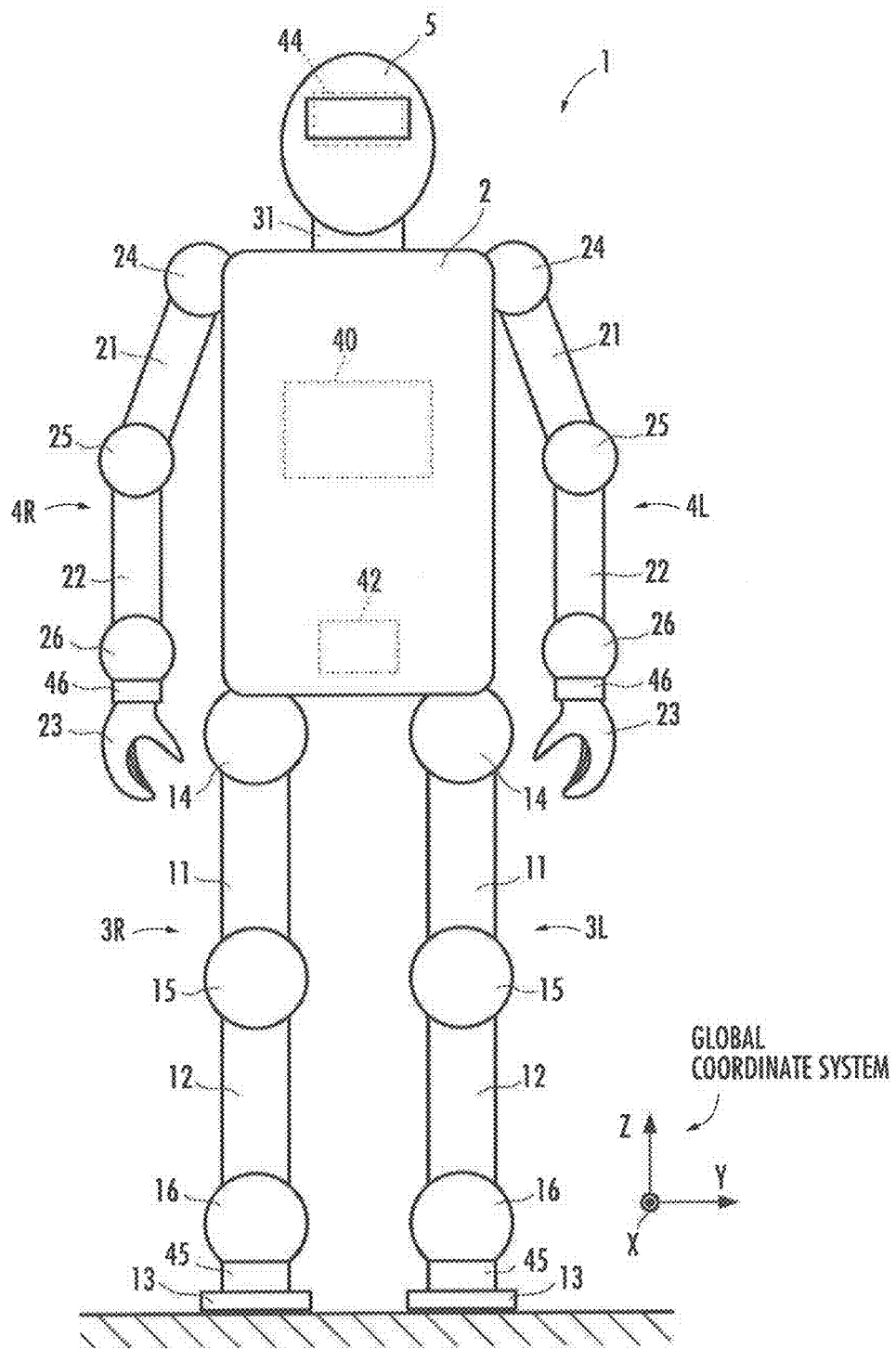

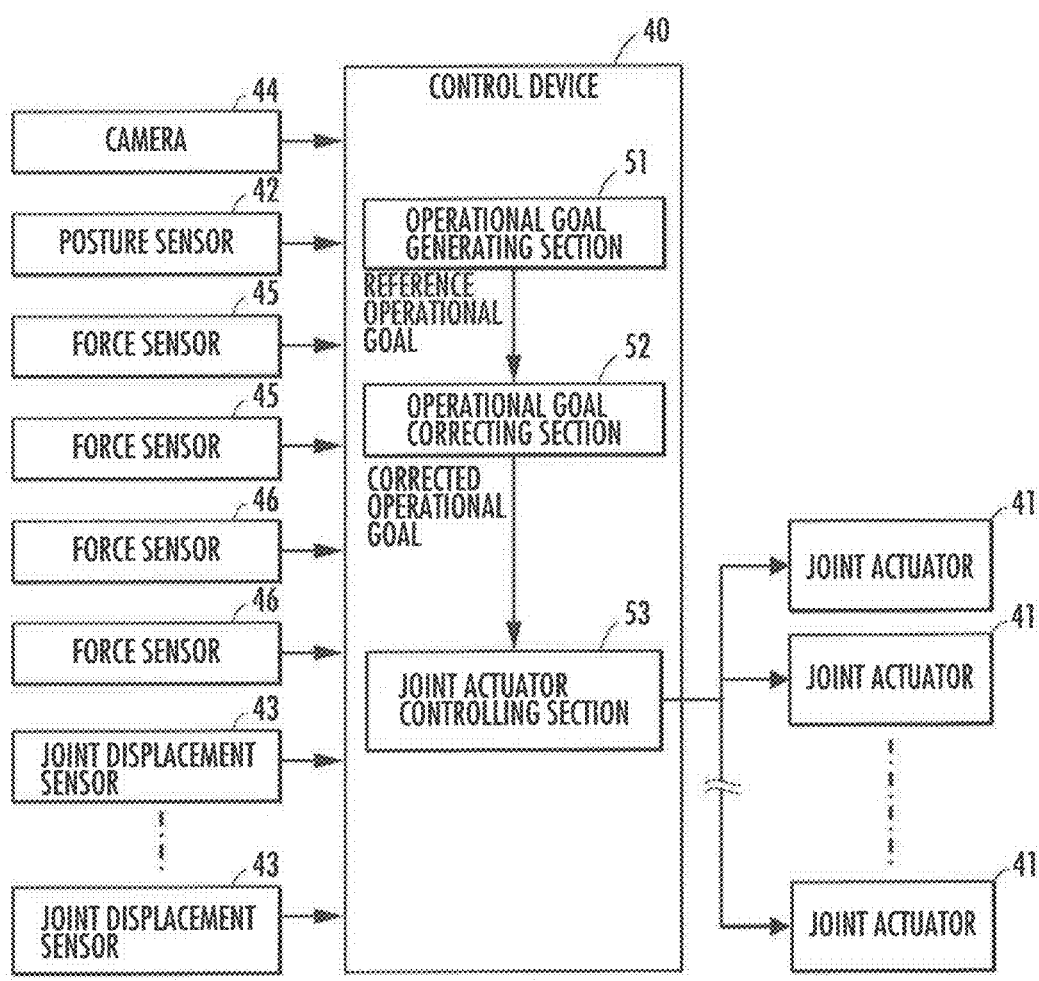

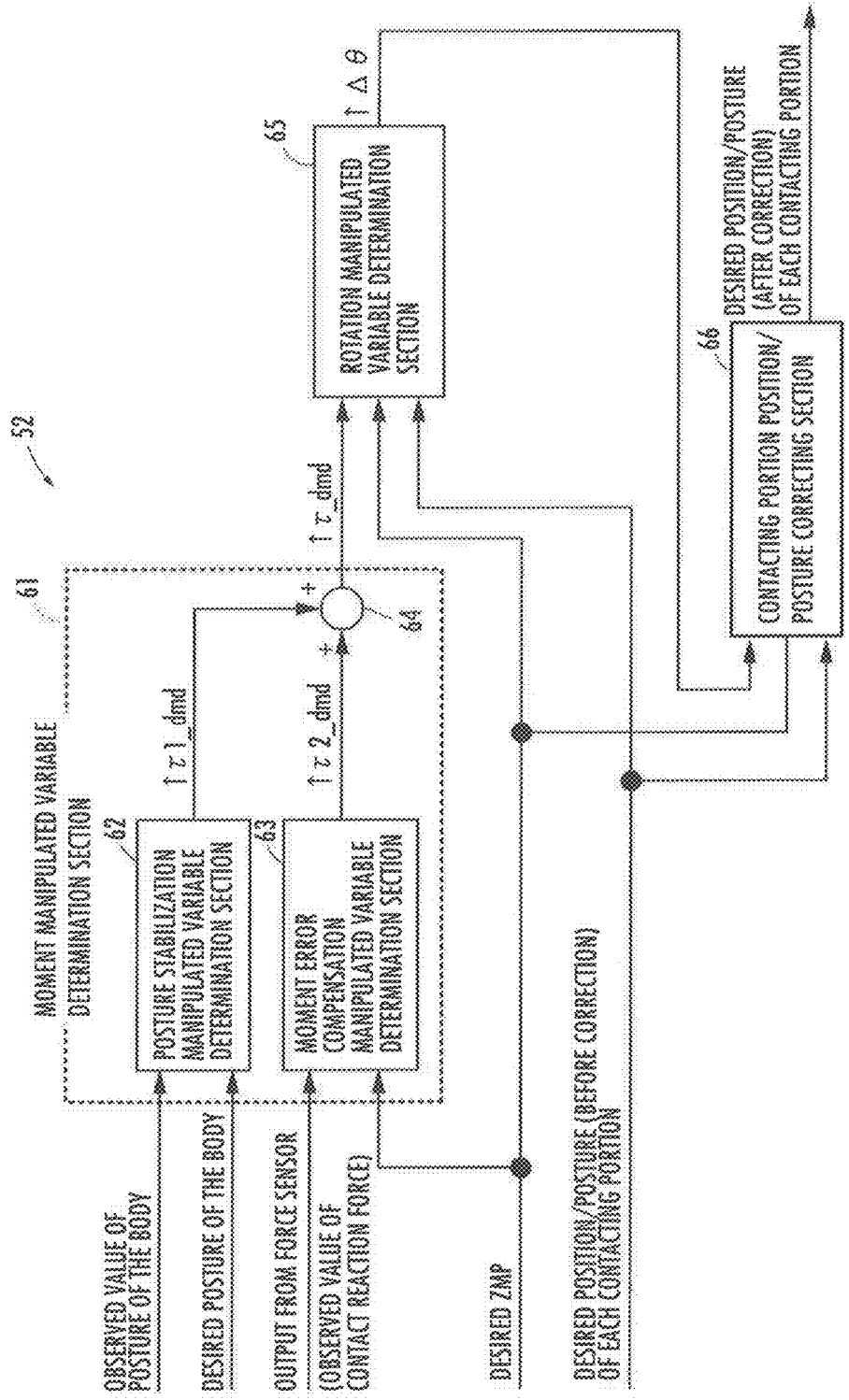

CONTROL DEVICE FOR MOBILE ROBOT

BACKGROUND OF THE INVENTION

Field of the Invention

The present invention relates to a control device for a mobile robot which moves with motions of a plurality of movable links extended from its body.

Description of the Related Art

Techniques related to operation control of a legged mobile robot, such as a humanoid robot, for correcting a desired position/posture (desired values of position and posture) of a foot of each lea link so as to cause an observed value of a body posture to approach a desired posture are conventionally known, as seen in, for example, Japanese Patent Application Laid-Open No. 2005-052968 (hereinafter, referred to as Patent Literature 1).

SUMMARY OF THE INVENTION

Recently, for a mobile robot such as a humanoid robot having a plurality of movable links extended from the body, techniques enabling the mobile robot to move, not only on a flat floor surface, but also in various kinds of environments including rough or irregular grounds, have been developed or studied.

To cause a mobile robot to move in various kinds of environments, there are many cases, depending on the environments, where the mobile robot is required to move while making its three or more movable links in contact with an external object such as a ground surface or the like as appropriate. For example, for a humanoid mobile robot to travel on a considerably rough irregular ground or the like, it is often necessary for the mobile robot to move while making its four movable links, i.e. two leg links and two arm links, brought into contact with external objects as appropriate so as to secure stability in posture of the mobile robot.

Even in the case where the mobile robot travels while making its three or more movable links in contact with external objects such as the ground surface or the like, for stabilizing the posture of the mobile robot, it is desirable that a desired position/posture of a site (hereinafter, referred to as a "contacting portion") of the movable link to be brought into contact with an external object be corrected in accordance with a deviation of a state quantity such as a posture of the body from its desired value.

Particularly in the environment including a rough or irregular ground, environmental information about, for example, the shape of the ground surface assumed during the processing of generating an operational goal for the mobile robot may often deviate from an actual environment. This makes it highly necessary to appropriately correct the desired position/posture of the contacting portion of the movable link to be brought into contact with the external object.

In this case, it is necessary to correct the desired position/posture of each contacting portion in such a manner that an external force moment appropriate for making the state quantity, such as the posture or the like of the body, approach its desired value may be added to the mobile robot. Further, it is desirable that the correction of the desired position/posture of each contacting portion be made independently of the number of movable links to be brought into contact with external object such as the ground surface or the like.

Patent Literature 1 mentioned above describes the way of correcting desired positions/postures of respective feet (contacting portions) of two leg links in the case of causing the feet to be brought into contact with a flat floor surface.

Patent Literature 1, however, does not include any description about the way of correcting a desired position/posture of each contacting portion in the case of causing three or more movable links, including an arm link or the like, to be brought into contact with various portions of external objects.

In the case of causing a plurality of movable links to come into contact with an external object, including the case where three or more movable links are brought into contact with an external object, if the processing of correcting the desired position/posture of each contacting portion is inappropriate, the mutual relationships in position and posture among the plurality of contacting portions may deviate relatively noticeably from the mutual relationships in position and posture defined by the desired positions/postures before correction.

In such a case, interference would likely occur between a plurality of movable links moved for traveling of the mobile robot. The mobile robot may attain an operational state having a low margin of keeping stability of its posture. This often leads to a situation where the continuous traveling of the mobile robot becomes difficult.

The present invention has been accomplished in view of the foregoing, and it is an object of the present invention to provide a control device which, in the case of correcting a desired position/posture of a contacting portion of each of a plurality of movable links to be brought into contact with an external object in such a manner that a required external force moment is added to the mobile robot, enables the correction to be made so as not to break the mutual relationships in position and posture among the contacting portions, irrespective of the shape of the external object or the number of the contacting portions.

To achieve the above object, a control device for a mobile robot according to the present invention is a control device for a mobile robot having a plurality of movable links extended from a body, each movable link being configured to move with respect to the body by an action of one or more joints disposed between a distal end of the movable link and the body, the mobile robot moving with a motion including an operation in which one or more movable links are moved in the air, not in contact with an external object, and a succeeding operation in which contacting portions as predetermined sites of the respective movable links are brought into contact with the external object, the control device including:

a moment manipulated variable determination section which, in accordance with a deviation between a desired value of a predetermined state quantity defined by an operational goal for the mobile robot and an observed value of the state quantity, determines a moment manipulated variable representing an external force moment to be added to the mobile robot so as to cause the deviation to approach zero;

a rotation manipulated variable determination section which, in accordance with the moment manipulated variable, determines a rotation manipulated variable representing a rotational amount by which position vectors, observed from a desired ZMP defined by the operational goal, of contact points between the external object and the contacting portions of respective contacting movable links, which are the one or more movable links among the plurality of movable links that are brought into contact with the external object, are to be rotated about the desired ZMP, the rotation manipulated variable being common to the respective contacting portions of all the contacting movable links;

a contacting portion position/posture correcting section which corrects a desired position/posture before correction, being a desired position/posture in the operational goal, of each of the contacting portions of the contacting movable links in accordance with a correction amount of the position/posture of that contacting portion, the correction amount including a translational displacement amount of the contacting portion produced when the contacting portion is rotated about the desired ZMP by the rotational amount indicated by the rotation manipulated variable from the desired position/posture before correction, the correction amount also including the rotational amount; and an actuator controlling section which determines a desired displacement amount for each joint of the mobile robot so as to implement a corrected desired position/posture of each contacting portion obtained by the contacting portion position/posture correcting section, and controls an actuator that drives the corresponding joint in accordance with the desired displacement amount;

wherein the rotation manipulated variable determination section is configure to determine the rotation manipulated variable by linearly converting the moment manipulated variable by a coefficient matrix such that a moment produced about the desired ZMP by an elastic rotational force produced along with rotation in posture of each contacting portion and an elastic translational force produced along with translational displacement of each contacting portion agrees with the moment manipulated variable, the coefficient matrix being determined from the position vector of the contact point of each contacting portion determined from the desired position/posture before correction of the contacting portion and the desired ZMP, a predetermined set value for a degree of stiffness of each contacting portion related to the rotation in posture of the contacting portion, and a predetermined set value for a degree of stiffness of each contacting portion related to the translational displacement of the contacting portion (first aspect of the invention).

In the present invention, the "operational goal" for a mobile robot means a goal that defines an overall operation of the mobile robot. The "position/posture" of a contacting portion means a set of "position" and "posture" of the contacting portion. The "desired position/posture" means a set of a desired value of "position" (desired position) and a desired value of "posture" (desired posture).

Further, the desired ZMP means a desired position of the so-called zero moment point (ZMP). The ZMP is a point at which a component about a horizontal axis of a moment produced about that point by the resultant force of the gravitational force acting on the mobile robot and the inertial force produced by the motion of the entire mobile robot, becomes zero.

It should be noted that the desired ZMP may be determined so as to satisfy the relational expressions (1a) to (1c) described below under circumstances where a plurality of contacting portions are brought into contact with various kinds of external objects.

Further, bringing a movable link or a contacting portion into "contact" with an external object means making the movable link or the contacting portion come into contact with the external object so that it may receive a contact reaction force therefrom.

Further, the "contact point" between a contacting portion and an external object means a center of contact pressure on the contact surface between the contacting portion and the external object.

The "observed value" of a state quantity means a detected value of the state quantity which is detected by an appropriate sensor, or an estimate which is estimated from a detected value of at least one another state quantity having a certain correlation with the state quantity, on the basis of the correlation.

According to the first aspect of the invention, the rotation manipulated variable determination section determines the rotation manipulated variable by linearly converting the moment manipulated variable by using the coefficient matrix.

The contacting portion position/posture correcting section uses, as a correction amount for the position/posture of each of the contacting portions of the contacting movable links, a translational displacement amount of the contacting portion, produced when the contacting portion is rotated about the desired ZMP by a rotational amount indicated by the rotation manipulated variable from a desired position/posture before correction, which is the desired position/posture in the operational goal, and also uses that rotational amount as the correction amount, to correct the desired position/posture before correction of each of the contacting portions of the contacting movable links in accordance with the correction amount.

This configuration makes it possible to correct the desired position/posture before correction of each of the contacting portions of the contacting movable links, such that the external force moment indicated by the moment manipulated variable may be added to the mobile robot, while maintaining the mutual relationships in position and posture (mutual relationship in terms of position and mutual relationship in terms of posture) among the contacting portions defined by the desired positions/postures before correction. In other words, it becomes possible to make the mutual relationships in position and posture among the contacting portions defined by the desired positions/postures after correction of the contacting portions agree with their mutual relationships in position and posture before correction.

The coefficient matrix is determined in the above-described manner by the processing in the rotation manipulated variable determination section, so it is determined to conform to the total number of contacting portions of the contacting movable links. The coefficient matrix can be determined by the processing in the rotation manipulated variable determination section, irrespective of the shape of an external object or the like, as long as the external object allows the contacting portions of the respective contacting movable links to come into contact therewith.

Therefore, according to the first aspect of the invention, in the case of correcting the desired position/posture of each of the contacting portions of a plurality of movable links (contacting movable links) to be brought into contact with an external object in such a manner that a required external force moment (indicated by the moment manipulated variable) is added to the mobile robot, the correction can be made while maintaining the mutual relationships in position and posture among the contacting portions, irrespective of the shape of the external object or the number of the contacting portions or the like. It is therefore possible to prevent the occurrence of a situation where it becomes difficult for the mobile robot to move continuously.

In the first aspect of the invention, it is preferable that the rotation manipulated variable determination section is configured to determine the coefficient matrix by the following expression (A) (second aspect of the invention).

$$\text{Coefficient matrix} = \left[ \sum_{i=1}^{N} K\_i \cdot (K\tau\_i + (\uparrow rc\_i^T \cdot \uparrow rc\_i \cdot I3 - \uparrow rc\_i \cdot \uparrow rc\_i^T) \cdot Kf\_i) \right]^{-1} \quad (A)$$

where

N is a total number of the movable links, i is an identification number of the contacting portion of each movable link, $K\tau\_i$ is a set value for the degree of stiffness related to the rotation in posture of an i-th contacting portion, $Kf\_i$ is a set value for the degree of stiffness related to the translational displacement of the i-th contacting portion, $\uparrow rc\_i$ is a position vector (column vector) of the i-th contacting portion observed from the desired ZMP, I3 is an identity matrix, and $K\_i$ is a variable which takes "1" in a contact state of the i-th contacting portion, takes "0" in a non-contact state of the i-th contacting portion, and takes a value that changes gradually from one value to the other value of "1" and "0" during a transition of the i-th contacting portion from one to the other of the contact state and the non-contact state.

According to the second aspect of the invention, it is possible to suitably determine the coefficient matrix for use in converting the external force moment indicated by the moment manipulated variable to the rotation manipulated variable. In the case where the contacting portion of each movable link is switched from one to the other of a contact state (where it is in contact with an external object) and a non-contact state (where it is not in contact with the external object), it is possible to reliably prevent the rotation manipulated variable from changing discontinuously. As a result, the correction of the desired position/posture of each contacting portion can be made smoothly. This ensures a smooth traveling operation of the mobile robot.

In the first or second aspect of the invention, it is preferable that the predetermined state quantity includes at least one of a posture of the body and a moment produced about the desired ZMP (third aspect of the invention).

This can enhance the stability of the overall posture of the mobile robot.

Further, in the first through third aspects of the invention, when a position in an X-axis direction, a position in a Y-axis direction, and a position in a Z-axis direction of the desired ZMP observed in a global coordinate system having two horizontal axes orthogonal to each other as an X axis and a Y axis and a vertical axis as a Z axis are denoted respectively as Pzmp[X], Pzmp[Y], and Pzmp[Z], the desired ZMP may be determined by the following expressions (1a), (1b), and (1c) (fourth aspect of the invention).

$$Pzmp[Z] = \frac{\sum_{i=1}^{N} Pcop\_i[Z] \cdot F\_i[Z]}{\sum_{i=1}^{N} F\_i[Z]} \quad (1a)$$

$$Pzmp[X] = \frac{-Ma[Y] - (Pg[Z] - Pzmp[Z]) \cdot Fa[X] + Pg[X] \cdot Fa[Z]}{Fa[Z]} \quad (1b)$$

$$Pzmp[Y] = \frac{Ma[X] - (Pg[Z] - Pzmp[Z]) \cdot Fa[Y] + Pg[Y] \cdot Fa[Z]}{Fa[Z]} \quad (1c)$$

where

N is a total number of the movable links, i is an identification number of the contacting portion of each movable link, Pcop_i[Z] is a position in the Z-axis direction of a desired position of a contact point of the contacting portion of the i-th movable link with an external object, F_i[Z] is a desired value of a component in the Z-axis direction of a contact reaction force acting on the contacting portion of the i-th movable link from the external object, Pg[Z], Pg[X], and Pg[Y] are a position in the Z-axis direction, a position in the X-axis direction, and a position in the Y-axis direction, respectively, of a desired position of an overall center of gravity of the mobile robot, Ma[X] and Ma[Y] are a component in a direction about the X axis and a component in a direction about the Y axis, respectively, of a moment that is produced about the overall center of gravity of the mobile robot by a resultant force of a gravitational force acting on the mobile robot and an inertial force produced by a desired motion of the entire mobile robot defined by the operational goal, and Fa[X], Fa[Y], and Fa[Z] are a component in the X-axis direction, a component in the Y-axis direction, and a component in the Z-axis direction, respectively, of a translational force constituting part of the resultant force of the gravitational force acting on the mobile robot and the inertial force produced by the desired motion of the entire mobile robot defined by the operational goal.

BRIEF DESCRIPTION OF THE DRAWINGS

FIG. 1 shows a mobile robot according to an embodiment of the present invention;

FIG. 2 is a block diagram showing a configuration related to the operation control of the mobile robot according to the embodiment;

FIG. 3 is a block and line diagram illustrating the processing performed by the operational goal correcting section shown in FIG. 2;

FIG. 4A and FIG. 4B show, by way of example, an operational state of the mobile robot in which FIG. 4A shows the operation state of the mobile robot before correction of an operational goal and FIG. 4B shows the operational state of the mobile robot after correction of the operational goal.

DESCRIPTION OF THE PREFERRED EMBODIMENTS

Figure 4A:
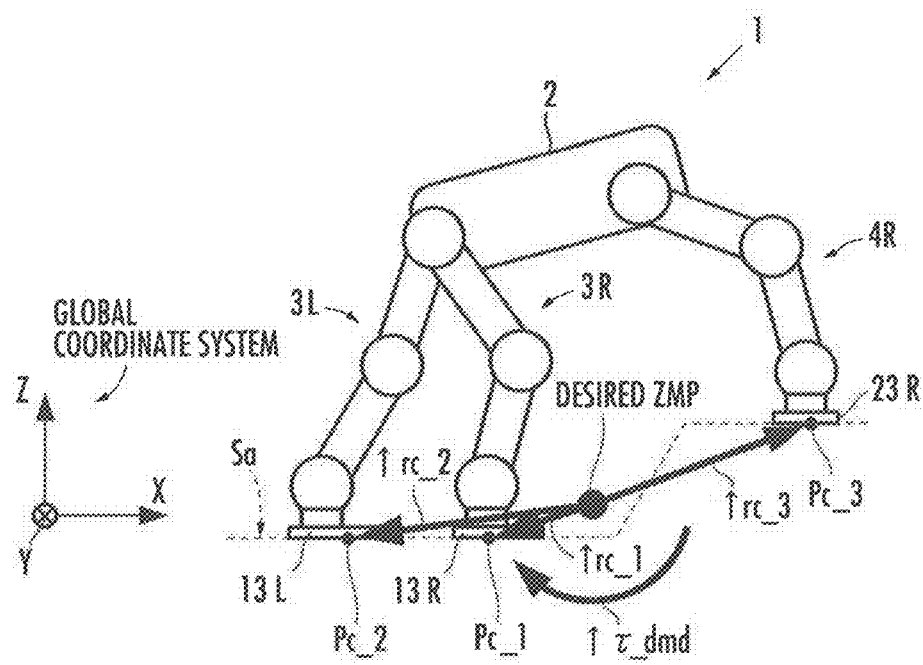

An embodiment of the present invention will e described below with reference to FIGS. 1 to 4B.

Referring to FIG. 1, a mobile robot 1 according to the present embodiment is a humanoid robot, by way of example. The mobile robot 1 (hereinafter, which may be simply referred to as "robot 1") has a body 2, corresponding to an upper body, a pair of right and left (or, two) leg links 3R, 3L, and a pair of right and left (or, two) arm links 4R, 4L, as a plurality of movable links extended from the body 2, and a head 5.

In the description of the present embodiment, "R" and "L" added to the reference characters indicate that the elements are on the right side and on the left side, respectively, with respect to the front of the body 2 of the robot 1. The symbol "R" or "L", however, will be omitted when it is unnecessary to distinguish between the right and the left.

Further, in the following description, the leg links 3R, 3L and arm links 4R, 4L may each be simply referred to as a movable link.

Each leg link 3 is extended from the lower portion of the body 2. Each leg link 3 is composed of element links corresponding respectively to a thigh 11, a crus 12, and a foot 13, which are joined via a hip joint 14, a knee joint 15, and an ankle joint 16 in this order from the body 2 side. The foot 13 as a distal portion of each leg link 3 is a site which constitutes a contacting portion that is brought into contact with an external object (ground surface, floor surface, wall surface, etc.) as appropriate during traveling or other occasions of the robot 1.

In the present embodiment, the joints 14, 15, and 16 arranged between the body 2 and the foot 13 of each leg link 3 are configured in such a manner that the foot 13 of the leg link 3 has six degrees of freedom of motion, for example, with respect to the body 2.

For example, the hip joint 14 is configured with three element joints (not shown) so as to have degrees of freedom of rotation about three axes in total. The knee joint 15 is configured with a single element joint (not shown) so as to have a degree of freedom of rotation about a single axis. The ankle joint 16 is configured with two element joints (not shown) so as to have degrees of freedom of rotation about two axes in total. It should be noted that an element joint is a joint having a degree of freedom of rotation about a single axis. The element joint is configured with two members engaged so as to be rotatable relative to each other about an avis.

Each arm link 4 is extended from the upper portion of the body 2. Each arm link 4 is composed of element links corresponding respectively to an upper arm 21, a forearm 22, and a hand 23, which are joined via a shoulder joint 24, an elbow joint 25, and a wrist joint 26 in this order from the body 2 side.

In the present embodiment, each arm link 4 is a movable link which may function as a leg link, besides the leg links 3, 3, which is brought into contact with an external object when necessary. In this case, the hand 23 as a distal portion of each arm link 4 is a site which constitutes a contacting portion that is brought into contact with an external object (ground surface, floor surface, wall surface, etc.) as appropriate in accordance with a mode of operation or the like during traveling of the robot 1.

In the present embodiment, the joints 24, 25, and 26 arranged between the body 2 and the hand 23 of each arm link 4 are configured in such a manner that the hand 23 of each arm link 4 has, for example, six degrees of freedom of motion with respect to the body 2, For example, the shoulder joint 24 is configured with three element joints (not shown) so as to have degrees of freedom of rotation about three axes in total. The elbow joint 25 is configured with a single element joint (not shown) so as to have a degree of freedom of rotation about a single axis. The wrist joint 26 is configured with two element joints (not shown) so as to have degrees of freedom of rotation about two axes in total.

In the present embodiment, the hand 23 of each arm link 4 is configured so as to be able to grasp an object. For example, each hand 23 is configured with an appropriate grasping mechanism, or with a plurality of finger mechanisms capable of operating in a similar manner as human hand fingers.

The head 5 is attached on top of the body 2 via a neck joint 31. The neck joint 31 is configured so as to have one or more degrees of freedom of rotation about one, two, or three axes.

The above has outlined the mechanical configuration of the robot 1.

The robot 1 configured as described above can travel with a motion which includes an operation in which at least one movable link 3 or 4, among the leg links 3 and the arm links 4, is moved in the air, not in contact with an external object, and a following operation in which the movable link 3 or 4 is brought into contact with the external object.

For example, two leg links 3, 3 may be moved in a motion pattern (of biped gait) similar to the leg motions in a walking operation of a human, to implement a walking operation of the robot 1.

In this case, the robot 1 may travel by moving the leg links 3, 3, while making an arm link 4 brought into contact with a wall, handrail, or the like, as appropriate.

Further, for example, four movable links 3, 3, 4, 4 may be used as legs. The four movable links 3, 3, 4, 4 may be moved in a motion pattern of trot, crawl, or pace (motion pattern of quadruped gait), to enable traveling of the robot 1.

Furthermore, for example, the four movable links 3, 3, 4, 4 may be used to ascend or descend a ladder or the like.

Supplementally, each leg link 3 or each arm link 4 of the robot 1 may be configured to have seven or more degrees of freedom of motion. Further, the joints in each leg link 3 and in each arm link 4 are not limited to the rotary or revolute joints; they may include prismatic joints.

In the case where the robot 1 is one that is not required to grasp an object by a hand 23, each arm link 4 may be constructed such that it has no mechanism for a grasping operation at its distal portion. The robot 1 may have no head 5.

Further, the body 2 may include a joint. For example, the body 2 may be configured with a lower body, to which the leg links 3, 3 are joined, an upper body, to which the arm links 4, 4 are joined, and a joint which joins the upper and lower bodies in a relatively displaceable manner.

A configuration related to the operation control of the robot 1 will now be described. In the following description, the foot 13 of each leg link 3 and the hand 23 of each arm link 4 may be generically referred to as a contacting portion (13 or 23).

As shown in FIG. 2, the robot 1 is provided with a control device 40 which performs operation control of the robot 1, joint actuators 41 for driving corresponding joints (element joints), and various sensors required. Although not shown in the figure, in the present embodiment, the robot 1 is also provided with an actuator for enabling a grasping operation of each hand 23.

The sensors mounted include: a posture sensor 42 for detecting a posture of the body 2 of the robot 1; joint displacement sensors 43 each detecting the amount of displacement (rotational angle) of a corresponding joint (element joint) of the robot 1; a camera 44 as a visual sensor of the robot 1; force sensors 45 each detecting an external force (translational force and moment) that the foot 13 of the corresponding leg link 3 receives from an external object with which the foot 13 is brought into contact; and force sensors 46 each detecting an external force (translational force and moment) that the hand 23 of the corresponding arm link 4 receives from an external object with which the hand 23 is brought into contact.

The posture sensor 42 is a sensor which is mounted on the body 2 so as to be able to detect the posture (spatial orientation) of the body 2 by a strapdown system, for example. The posture sensor 42 is made up of a gyro sensor which detects angular velocities in three axes, and an acceleration sensor which detects translational accelerations in the three axes.

A joint displacement sensor 43 is disposed for each element joint. Each joint displacement sensor 43 is made up of a rotational angle sensor such as a rotary encoder, potentiometer, or the like.

The camera 44 is composed of a stereo camera, for example. The camera 44 is mounted on the head 5, as shown in FIG. 1, for example. In place of, or in addition to, the camera 44, a scanning-type laser ranging sensor or other ranging sensor (for example, laser range finder) may be mounted on the robot 1. The camera 44 may be mounted on the body 2.

A force sensor 45 is disposed for each leg link 3. For example as shown in FIG. 1, each force sensor 45 is made up of a six-axis force sensor which is interposed between the ankle joint 16 and the foot 13 of the corresponding leg link 3.

A force sensor 46 is disposed for each arm link 4. As shown in FIG. 1, each force sensor 46 is made up of a six-axis force sensor which is interposed between the wrist joint 26 and the hand 23 of the corresponding arm link 4.

A joint actuator 41 is disposed for each element joint. Each joint actuator 41 is made up of an electric motor or a hydraulic actuator. It should be noted that the joint actuator 41 may be a rotary actuator or a linear actuator.

The control device 40 is configured with an electronic circuit unit which includes a CPU, a RAM, a ROM, and an interface circuit. The control device 40 receives detection signals from the sensors described above. The control device 40 may be made up of a plurality of mutually communicable electronic circuit units.

The control device 40 includes, as functions implemented when installed programs are executed, or as functions implemented by hardware configurations: an operational goal generating section 51 which generates an operational goal as a reference (hereinafter, "reference operational goal") that defines an action of each joint of the robot 1; an operational goal correcting section 52 which corrects the reference operational goal as appropriate in accordance with an actual operational state, for example, of the robot 1; and a joint actuator controlling section 53 which controls each joint actuator 41 in accordance with the corrected operational goal.

The operational goal correcting section 52, as shown in FIG. 3, includes: a moment manipulated variable determination section 61 which determines a moment manipulated variable $\uparrow\tau\_dmd$, which is an external force moment that should be added to the robot 1 in order to adjust a state quantity, such as a posture of the body 2, of the robot 1; a rotation manipulated variable determination section 65 which determines a rotation manipulated variable $\uparrow\Delta\theta$ for use in correcting a desired position/posture of each contacting portion (13 or 23) to be brought into contact with an external object from a desired position/posture in a reference operational goal (before correction); and a contacting portion position/posture correcting section 66 which corrects the desired position/posture of each contacting portion (13 or 23) to be brought into contact with an external object, by using the rotation manipulated variable $\uparrow\Delta\theta$.

To give supplemental explanation about the terms used herein, the "position/posture" of a given site, such as a contacting portion of the robot 1, means a set of "position" and "posture" of the site. The "desired position posture" of a given site means a set of a desired value for position (or, desired position) of the site and a desired value for posture (or, desired posture) of the site, In this case, the "position" of a given site means the spatial position of a representative point of the site that is designed and set as appropriate to the site, and the "posture" of the site means the spatial orientation of the site.

Further, a reference character prefixed with "$\uparrow$", such as "$\uparrow\tau\_dmd$", is a reference character representing a vector. In the present specification, the vector is a column vector with a plurality of components arranged.

The processing performed by the control device 40 will now be described more specifically. In the following description, the leg links 3R, 3L, and the aria links 4R, 4L may be referred to as the first movable link 3R, the second movable link 3L, the third movable link 4R, and the fourth movable link 4L, respectively. Further, a given one of the first through fourth movable links 3R, 3L, 4R, and 4L may be referred to as the i-th movable link.

The control device 40 sequentially generates a reference operational goal for the robot 1, in the operational goal generating section 51, on the basis of information on an outside world (or, external information) acquired via the camera 44 and the like, and on the basis of an operation command received from an external server or the like, or taught in advance.

The reference operational goal refers to an operational goal as a basic guideline for causing the robot 1 to perform a required motion according to the operation command, in an environment recognized by the external information acquired. The operational goal is generated, using an appropriate dynamic model, so as to be able to define the action of each joint of the robot 1 (in other words, an overall motion of the robot 1), while fulfilling the dynamic constraints regarding the zero moment point (ZMP) and the like. The operational goal may be generated in a known manner.

In the present embodiment, the reference operational goal includes a trajectory of desired position/posture as a reference for a respective one of the feet 13 of the leg links 3 and the hands 23 of the arm links 4 (i.e. for each of the contacting portions of the respective movable links 3, 4), a trajectory of desired position/posture as a reference of the body 2, and a trajectory of desired posture as a reference of the head 5. The term "trajectory" means a time series of instantaneous values (for each predetermined control processing cycle).

In this case, in the present embodiment, the desired positions/postures of the respective feet 13, the respective hands 23, and the body 2 are expressed as desired values for position and posture observed in a global coordinate system that is designed and set with respect to the outside world of the robot 1. The desired posture of the head 5 is expressed as a desired value for relative posture of the head 5 observed in a local coordinate system that is designed and set with respect to the body 2.

For the global coordinate system, a three-axis orthogonal coordinate system having an Z axis in a vertical direction and an X axis and a Y axis in two horizontal axes orthogonal to each other, as shown in FIG. 1, for example, may be used. Hereinafter, the X axis, the Y axis, and the Z axis refer to the coordinate axes in the global coordinate system, unless otherwise specified.

The reference operational goal generated by the operational goal generating section 51 further includes a trajectory of a desired ZMP, which is a desired position of the ZMP.

More specifically, the ZMP is a point at which components in the directions about the horizontal axes (the direction about the X axis and the direction about the Y axis) of a moment produced about that point due to the resultant force of the gravitational force acting on the robot 1 and the inertial force produced by the motion of the robot 1 become zero.

Here, in the case where the robot 1 is to move on a single, planar floor surface, the ZMP becomes a point on that floor surface. On the other hand, in the case where the contact surfaces of two or more contacting portions foot or feet 13 and/or hand(s) 23) of the robot 1 with an external object are not on a single, planar surface (for example as illustrated in FIG. 4A), the ZMP becomes a point away of any planes that respectively include the contact surfaces of the contacting portions.

In the present embodiment, a desired position of the ZMP, or, the desired ZMP, is calculated by the following expressions (1a), (1b), and (1c).

$$Pzmp[Z] = \frac{\sum_{i=1}^{N} Pcop\_i[Z] \cdot F\_i[Z]}{\sum_{i=1}^{N} F\_i[Z]} \tag{1a}$$

$$Pzmp[X] = \frac{-Ma[Y] - (Pg[Z] - Pzmp[Z]) \cdot Fa[X] + Pg[X] \cdot Fa[Z]}{Fa[Z]} \tag{1b}$$

$$Pzmp[Y] = \frac{Ma[X] - (Pg[Z] - Pzmp[Z]) \cdot Fa[Y] + Pg[Y] \cdot Fa[Z]}{Fa[Z]} \tag{1c}$$

Here, Pzmp[Z], Pzmp[X], and Pzmp[Y] represent a position in the Z-axis direction, a position in the X-axis direction, and a position in the Y-axis direction, respectively, of the desired ZMP. N represents a total number of the movable links (in the present embodiment, N=4), Pcop_i[Z] represents a position in the Z-axis direction of a desired position of a contact point at which a contacting portion (foot 13 or hand 23) of the i-th movable link comes into contact with an external object (more specifically, a center of contact pressure on the contact surface between the contacting portion and the external object), and F_i[Z] represents a desired value of a component in the Z-axis direction of a contact reaction force (translational force) that acts on the contacting portion of the i-th movable link from the external object.

Further, Pg[Z], Pg[X], and Pg[Y] represent a position in the Z-axis direction, a position in the X-axis direction, and a position in the Y-axis direction, respectively, of a desired position of the overall center of gravity of the robot 1. Ma[X] and Ma[Y] represent a component in the direction about the X axis and a component in the direction about the Y axis, respectively, of a moment that is produced about the overall center of gravity of the robot 1 by the resultant force of the gravitational force acting on the robot 1 and the inertial force produced by a desired motion of the entire robot 1 (desired motion defined by the reference operational goal). Fa[X], Fa[Y], and Fa[Z] represent a component in the X-axis direction, a component in the Y-axis direction, and a component in the Z-axis direction, respectively, of a translational force constituting part of the resultant force.

It should be noted that in the desired motion of the robot 1, in the state where the i-th movable link is not in contact with an external object, F_i[Z] in the above expression (1a) is zero (and, hence, Pcop_i[Z]·F_i[Z]=0). Further, the value obtained by reversing the polarity of Fa[Z] (=−Fa[Z]) equals the value of the denominator of the expression (1a).

With the above expression (1a), the position in the Z-axis direction (in the vertical direction) of the desired ZMP is calculated as a weighted average of the positions in the Z-axis direction of the respective contact points of all the contacting portions or feet 13 and/or hand(s) 23) to be brought into contact with an external object. In this case, the weighting factor for the position in the Z-axis direction of the contact point of a contacting portion corresponds to a ratio borne by the component F_i[Z] in the Z-axis direction of the contact reaction force (translational force) caused to act on that contacting portion (with respect to the component in the Z-axis direction (=the value of the denominator of the expression (1a)) of the total contact reaction force (translational force) acting on the robot 1).

The position in the X-axis direction and the position in the Y-axis direction of the desired ZMP calculated using the expressions (1b) and (1c), respectively, are calculated as a position in the X-axis direction and a position in the Y-axis direction of a point where a moment component in the direction about the X axis and a moment component in the direction about the Y axis produced by the aforesaid resultant force at the position Pzmp[Z] in the Z-axis direction calculated by the expression (1a) both become zero.

The desired ZMP calculated in the above-described manner (desired ZMP defined by the reference operational goal) becomes a point on a planar floor surface in the case where the robot 1 moves on the floor surface. On the other hand, in the case where the contact surfaces of two or more contacting portions foot or feet 13 and/or hand(s) 23) of the robot 1 with an external object are not on a single plane, the desired ZMP becomes a point off any planes that respectively include the contact surfaces of the contacting portions, as shown in FIG. 4A, for example.

Here, FIG. 4A shows, by way of example, the robot 1 in the state where the feet 13R, 13L of the respective leg links 3R, 3L, and the hand 23R of the arm link 4R (in other words, the contacting portions (13R, 13L, 23R) of the first through third movable links 3R, 3L, 4R, respectively) of the robot 1 are in contact with (or, landed on) a stepped floor surface (external object) indicated by a broken line Sa, in a reference operational goal. In FIG. 4A, the head 5 and the left arm link 4L of the robot 1 are not illustrated.

The processing of calculating a desired ZMP as described above is not limited to the case where the robot 1 travels on a floor surface. It also applies to the case where the robot 1 moves while bringing its arm link(s) 4 into contact with a wall or the like, the case where the robot 1 travels on an irregular ground with rubble, or the case where the robot 1 ascends and descends a ladder.

The control device 40 generates a reference operational goal for the robot 1 in the operational goal generating section 51 in the above-described manner. It should be noted that the processing of generating a reference operational goal may be performed in an external server or the like. In such a case, the control device 40 may acquire, at any time, the operational goal generated in the server or the like, through radio communications or the like.

The control device 40 performs processing of correcting the reference operational goal as appropriate, in the operational goal correcting section 52, sequentially at a prescribed control processing cycle. This correcting processing is for preventing, as much as possible, the deviation of an actual value of a predetermined state quantity of the robot 1 from its desired value defined by the reference operational goal, due to a discrepancy between a state of an outside world (or, an external state) (shape of a floor surface etc.), indicated by the external information that the control device 40 has obtained using the camera 44 and the like, and an actual external state, or due to a modeling error of the dynamic model used for generating the reference operational goal.

In the present embodiment, the predetermined state quantity includes, for example, the following two quantities: a posture of the body 2 (specifically, inclination posture in the direction about the X axis and that in the direction about the Y axis); and a moment produced about the desired ZMP (specifically, moment in the direction about the X axis and that in the direction about the Y axis).

The operational goal correcting section 52 corrects the desired position/posture of each contacting portion (13 or 23) to be brought into contact with an external object, so as to prevent as much as possible the deviation of the actual posture of the body 2 of the robot 1 and the moment actually produced about the desired ZMP from their desired values.

Such processing performed by the operational goal correcting section 52 will now be described in detail with reference to FIG. 3.

In each control processing cycle, the operational goal correcting section 52 performs the processing shown by the block and line diagram in FIG. 3. Specifically, the operational goal correcting section 52 first determines, in the moment manipulated variable determination section 61, a moment manipulated variable ↑τ_dmd for making the actual posture of the body 2 and the actual moment about the desired. ZMP approach their desired values.

The moment manipulated variable determination section 61 determines a first manipulated variable component ↑τ1_dmd and a second manipulated variable component ↑τ2_dmd in a posture stabilization manipulated variable determination section 62 and a moment error compensation manipulated variable determination section 63, respectively. The first manipulated variable component ↑τ1_dmd is a manipulated variable component of an external force moment about the desired ZMP that should be added to the robot 1 so as to cause the actual posture of the body 2 to approach a desired posture in the reference operational goal. The second manipulated variable component ↑τ2_dmd is a manipulated variable component of the external force moment about the desired ZMP that should be added to the robot 1 so as to cause the actual moment about the desired ZMP to approach its desired value.

The first manipulated variable component ↑τ1_dmd and the second manipulated variable component ↑τ2_dmd each represent a value of required increase or decrease of the external force moment acting about the desired ZMP (a moment by the contact reaction force acting on the robot from the external object).

The moment manipulated variable determination section 61 combines (sums up) the first manipulated variable component ↑τ1_dmd and the second manipulated variable component ↑τ2_dmd, in an arithmetic section 64, to determine the moment manipulated variable ↑τ_dmd.

The processing in the posture stabilization manipulated variable determination section 62 and the moment error compensation manipulated variable determination section 63 are carried out in the following manner.

The posture stabilization manipulated variable determination section 62 sequentially acquires a desired posture of the body 2 in a reference operational goal, and an observed value of the actual posture of the body 2 estimated by the control device 40 on the basis of an output from the aforesaid posture sensor 42. The posture stabilization manipulated variable determination section 62 calculates a first manipulated variable component ↑τ1_dmd, from a deviation between the desired posture and the observed value of the posture of the body 2, by a feedback control law, so as to make the deviation approach zero. In the present embodiment, a proportional-differential law (PD law), for example, is used as the feedback control law in this case.

Specifically, a component τ1_dmd[X] in the direction about the X axis and a component τ1_dmd[Y] in the direction about the Y axis of ↑τ1_dmd are calculated by the following expressions (2a) and (2b), respectively, in accordance with the PD law.

$$\tau 1\_dmd[X] = Kpx \cdot D\theta[X] + Kvx \cdot dD\theta[X] \quad (2a)$$

$$\tau 1\_dmd[Y] = Kpy \cdot D\theta[X] + Kvy \cdot dD\theta[Y] \quad (2b)$$

Here, Dθ[X] represents an inclination angle deviation between the desired posture and the observed value of actual posture of the body 2 in the direction about the X axis, dDθ[X] is a temporal change rate (differential value) of the inclination angle deviation Dθ[X], Dθ[Y] represents an inclination angle deviation between the desired posture and the observed value of actual posture of the body 2 in the direction about the Y axis, dDθ[Y] is a temporal change rate (differential value) of the inclination angle deviation Dθ[Y], and Kpx, Kvx, Kpy, and Kvy are gains of predetermined values.

In the present embodiment, a component τ1_dmd[Z] in the direction about the Z axis of ↑τ1_dmd is set to be constantly zero.

It should be noted that the feedback control law for use in calculating ↑τ1_dmd may be one other than the PD law.

The moment error compensation manipulated variable determination section 63 acquires an observed value of a moment actually produced about the desired ZMP, on the basis of an observed value of a contact reaction force (translational force and moment) indicated by an output from a force sensor 45 or 46 corresponding to each contacting portion (13 or 23) that is brought into contact with an external object.

In this case, the desired values for the component in the direction about the X axis and the component in the direction about the Y axis of the moment about the desired ZMP are both zero. Thus, the observed values of the component in the direction about the X axis and the component in the direction about the Y axis of the moment, as they are, indicate deviations from their desired values (errors with respect to the desired values).

Thus, the moment error compensation manipulated variable determination section 63 reverses the polarities of the observed values of the component τzmp_act[X] in the direction about the X axis and the component τzmp_act[Y] in the direction about the Y axis of the actual moment about the desired ZMP, and sets the resultant values as a component τ2_dmd[X] (=−τzmp_act[X]) in the direction about the X axis and a component τ2_dmd[Y] (=−τzmp_act[Y]) in the direction about the Y axis, respectively, of the second manipulated variable component ↑τ2_dmd.

It should be noted that −τzmp_act[X] and −τzmp_act[Y] may each be multiplied by a gain of a prescribed value not greater than 1, and the resultant values may be set as τ2_dmd[X] and τ2_dmd[Y], respectively.

Next, the operational goal correcting section 52 determines, in the rotation manipulated variable determination section 65, a rotation manipulated variable ↑Δθ for correcting the desired position/posture (in the reference operational goal) of each contacting portion (13 or 23) so that the moment manipulated variable ↑τ_dmd determined in the above-described manner is added to the robot 1.

Here, in the present embodiment, the processing of correcting the desired position/posture of each contacting portion (13 or 23) so as to cause the moment manipulated variable ↑τ_dmd to be added to the robot 1 is performed such that, for each of all the contacting portions to be brought into contact with an external object in the reference operational goal, the position of the contact point (center point of contact pressure) of that contacting portion is corrected to a position rotated about the desired ZMP, from its desired position (before correction) the reference operational goal, by an amount of rotation that is common to all the contacting portions. The common amount of rotation in this case corresponds to the aforesaid rotation manipulated variable ↑Δθ. It should be noted that the contacting portion (13 or 23) to be brought into contact with an external object corresponds to the contacting portion of a contacting movable link in the present invention.

The rotation manipulated variable ↑Δθ is calculated according to the expression (8) below, which is established as described below. In the following description, the contacting portion (13 or 23) of the i-th movable link 3 or 4 will be referred to as the i-th contacting portion. Further, for given vectors (column vectors) ↑a and ↑b, ↑a×↑b means a vector product (exterior or outer product), and ↑a·↑b means an inner product. Further, ↑a$^T$ means a transposed vector (row vector) of ↑a.

When a moment and a translational force constituting the contact reaction force that is made to additionally act on the i-th contacting portion so as to cause the moment manipulated variable ↑τ_dmd to be added to the robot 1 about the desired ZMP are denoted as ↑τ_i and ↑f_i, respectively, and a position vector of the contact point (center of contact pressure) of the i-th contacting portion observed from the desired ZMP is denoted as ↑rc_i, then the relationship between ↑τ_dmd and these ↑τ_i, ↑f_i, and ↑rc_i can be expressed by the following expression (3).

$$\uparrow \tau\_dmd = \sum_{i=1}^{N} K\_i \cdot (\uparrow \tau\_i + \uparrow rc\_i \times \uparrow f\_i) \tag{3}$$

Here, N represents a total number of the movable links 3, 4 (in the present embodiment, N=4), and K_i is a variable that takes "1" in the state (contact state) where the i-th contacting portion is in contact with an external object and takes "0" in the state (non-contact state) where it is not in contact with the external object. In the present embodiment, the value of the variable K_i is set such that, when the i-th contacting portion is switched from one to the other of the contact and non-contact states, the value changes gradually from one to the other of "1" and "0" at a predetermined temporal change rate (or in a predetermined change pattern over time).

It should be noted that in the state where a contacting portion (13 or 23) of a single movable link 3 or 4 alone is in contact with an external object, the contact point corresponding to the single contacting portion (13 or 23) agrees with the desired ZMP. Thus, ↑rc_i corresponding to the single contacting portion (13 or 23) becomes zero.

Further, when the degree of stiffness related to the rotational displacement (elastic deformation by the rotational force about the desired ZMP) and the degree of stiffness related to the translational displacement (elastic deformation by the translational force) of the i-th contacting portion are denoted as Kτ_i and Kf_i, respectively, and the translational displacement amount of the contact point of the i-th contacting portion in the case where the i-th contacting portion is rotated about the desired ZMP by the rotational amount ↑Δθ is denoted as ↑ΔPc_i, then the relationship between ↑τ_i and ↑Δθ, the relationship between ↑f_i and ↑ΔPc_i, and the relationship between ↑ΔPc_i and ↑Δθ are expressed by the following expressions (4a), (4b), and (4c), respectively.

$$\uparrow \Delta\theta = \uparrow \tau\_i / K\tau\_i \tag{4a}$$

$$\uparrow \Delta Pc\_i = \uparrow f\_i / Kf\_i \tag{4b}$$

$$\uparrow \Delta Pc\_i = \uparrow \Delta\theta \times \uparrow rc\_i \tag{4c}$$

It should be noted that the degree of stiffness Kτ_i more specifically represents an amount of change of each component of the moment ↑τ_i that is produced elastically per unit rotational amount in the direction about each coordinate axis (X axis, Y axis, Z axis) of the i-th contacting portion. Similarly, the degree of stiffness Kf_i more specifically represents an amount of change of each component of the translational force ↑f_i that is produced elastically per unit displacement amount in the direction of each coordinate axis (X axis, Y axis, Z axis) of the i-th contacting portion. Further, ↑τ_i and ↑f_i correspond to the elastic rotational force and the elastic translational force, respectively, of the present invention, Supplementally, Kτ_i may be a diagonal matrix having, as diagonal elements, set values for the degree of stiffness related to the rotational displacement in the directions about the respective coordinate axes. Similarly, Kf_i may be a diagonal matrix having, as diagonal elements, set values for the degree of stiffness related to the translational displacement in the directions of the respective coordinate axes.

When the expressions (4a) to (4c) are applied to the aforesaid expression (3), the following expression (5) is obtained.

$$\uparrow \tau\_dmd = \sum_{i=1}^{N} K\_i \cdot (K\tau\_i \cdot \uparrow \Delta\theta + \uparrow rc\_i \times (\uparrow \Delta\theta \times \uparrow rc\_i) \cdot Kf\_i) \tag{5}$$

Further, according to the formula related to the vector product (exterior product), the following expression (6) holds.

$$\uparrow rc\_i \times (\uparrow \Delta\theta \times \uparrow rc\_i) = (\uparrow rc\_i \cdot \uparrow rc\_i) \cdot \uparrow \Delta\theta - (\uparrow rc\_i \cdot \uparrow \Delta\theta) \cdot \uparrow rc\_i \tag{6}$$

$$= (\uparrow rc\_i^T \cdot \uparrow rc\_i \cdot I3 - \uparrow rc\_i \cdot \uparrow rc\_i^T) \cdot \uparrow \Delta\theta$$

It should be noted that I3 is an identity matrix of order 3. Further, the superscript "T" means transposition.

When this expression (6) is applied to the expression (5), the following expression (7) is obtained.

$$\uparrow \tau\_dmd = \tag{7}$$

$$\left\{ \sum_{i=1}^{N} K\_i \cdot (K\tau\_i + (\uparrow rc\_i^T \cdot \uparrow rc\_i \cdot I3 - \uparrow rc\_i \cdot \uparrow rc\_i^T) \cdot Kf\_i) \right\} \cdot \uparrow \Delta\theta$$

Accordingly, ↑Δθ can be calculated, as expressed by the following expression (8), by multiplying an inverse matrix A$^{-1}$ of a matrix A (of 3 rows and 3 columns), defined by the expression (9) in the proviso, by ↑τ_dmd (by linearly converting ↑τ_dmd by the inverse matrix A$^{-1}$).

$$\uparrow \Delta\theta = A^{-1} \cdot \uparrow \tau\_dmd \qquad (8)$$

where $$A \equiv \sum_{i=1}^{N} K\_i \cdot (K\tau\_i + (\uparrow rc\_i^T \cdot \uparrow rc\_i \cdot I3 - \uparrow rc\_i \cdot \uparrow rc\_i^T) \cdot Kf\_i) \qquad (9)$$

The rotation manipulated variable determination section 65 thus calculates the rotation manipulated variable $\uparrow\Delta\theta$, from the moment manipulated variable $\uparrow\tau\_dmd$, by the above expression (8). In this case, the value of the variable K_i that is necessary for determining the inverse matrix $A^{-1}$ to be multiplied to $\uparrow\tau\_dmd$ is set to "1", or to "0", or to a value that changes over time from one to the other of "1" and "0", depending on whether the i-th contacting portion is in the state in contact with an external object, or in the state not in contact with the external object, or in transition between these states, as explained above.

Further, the values of the degrees of stiffness K$\tau$_i and Kf_i are set values which are set in advance for a respective one of the contacting portions (13, 23) of the movable links 3, 4.

Further, $\uparrow rc\_i$ is calculated from a desired ZMP ($\uparrow$Pzmp) in the reference operational goal and a desired position of the contact point (center of contact pressure) of the i-th contacting portion defined by the desired position/posture (before correction) of the i-th contacting portion.

It should be noted that in the present embodiment, the component in the direction about the Z axis of $\uparrow\tau\_dmd$ is zero, so the component in the direction about the Z axis of $\uparrow\Delta\theta$ is also zero.

Supplementally, the inverse matrix $A^{-1}$ corresponds to the coefficient matrix in the present invention. The above expression (9) is identical to the aforesaid expression (A).

Calculating the rotation manipulated variable $\uparrow\Delta\theta$ in the above-described manner makes it possible to determine the rotation manipulated variable $\uparrow\Delta\theta$ as the amount of rotation by which each contacting portion is rotated about the desired ZMP so as to be able to implement $\uparrow\tau\_dmd$.

Next, the operational goal correcting section 52 performs, in the contacting portion position/posture correcting section 66, processing of correcting the desired position/posture of each contacting portion (13 or 23) to be brought into contact with an external object, in accordance with the rotation manipulated variable $\uparrow\Delta\theta$.

In this case, the contacting portion position/posture correcting section 66 sets, for each of the contacting portions (13, 23) to be brought into contact with the external object, the rotation manipulated variable $\uparrow\Delta\theta$ as a correction amount of the posture of the contacting portion (13 or 23).

Further, the contacting portion position/posture correcting section 66 sets, for each of the contacting portions (13, 23) to be brought into contact with the external object, a translational displacement amount $\uparrow\Delta P\_i$ in the case of rotating the contacting portion (13 or 23) about the desired ZMP by the rotation amount $\uparrow\Delta\theta$ from the desired position (before correction) in the reference operational goal, as a correction amount of the desired position of the contacting portion (13 or 23).

In this case, the translational displacement amount $\uparrow\Delta P\_i$ of each contacting portion (13 or 23) to be brought into contact with the external object is calculated from the position vector $\uparrow r\_i$, observed from the desired ZMP, of the desired position of the contacting portion (13 or 23) in the reference operational goal, and the rotation manipulated variable $\uparrow\Delta\theta$, by the following expression (10).

$$\uparrow\Delta P\_i = \uparrow\Delta\theta \times \uparrow r\_i \qquad (10)$$

It should be noted that $\uparrow r\_i$ is calculated from the desired position of the contacting portion (13 or 23) in the reference operational goal and the desired ZMP.

The contacting portion position/posture correcting section 66 then corrects the desired position/posture (in the reference operational goal) of each contacting portion (13 or 23) to be brought into contact with an external object, by correcting the desired position to a position displaced by the correction amount $\uparrow\Delta P\_i$, and by correcting the desired posture to a posture rotated by the correction amount $\uparrow\Delta\theta$.

As a result, the desired position/posture of any contacting portion (13 or 23) to be brought into contact with an external object is corrected to a position/posture rotated about the desired ZMP by the rotational amount $\uparrow\Delta\theta$ from the desired position/posture in the reference operational goal.

In the state where only a contacting portion (13 or 23) of a single movable link 3 or 4 is in contact with an external object, the desired position/posture of the contacting portion (13 or alone is corrected to a position/posture rotated about the desired ZMP by the rotational amount $\uparrow\Delta\theta$.

In the above-described manner, the operational goal correcting section 52 corrects the desired position/posture of each contacting portion (13 or 23) to be brought into contact with an external object, included in the reference operational goal. As for the desired position/posture of any portion other than the contacting portions (13, 23) to be brought into contact with an external object, or more specifically, as for the desired position/posture of a contacting portion (13 or 23) of any movable link 3, 4 that is not to be brought into contact with an external object, the desired position/posture of the body 2, and the desired posture of the head 5, the operational goal correcting section 52 maintains them as those in the reference operational goal. Alternatively, the desired position/posture of a contacting portion (13 or 23) of any movable link 3, 4 that is not to be brought into contact with an external object may be corrected to a position/posture rotated about the desired ZMP by the rotational amount $\uparrow\Delta\theta$, as with each contacting portion (13 or 23) to be brought into contact with an external object.

With the processing performed by the operational goal correcting section 52 as described above, in the state where the moment manipulated variable $\uparrow\tau\_dmd$ is not zero, the desired position/posture of each contacting portion (13 or 23) to be brought into contact with an external object is corrected, from the desired position/posture in the reference operational goal, to a position/posture obtained by rotating the same about the desired ZMP by the rotational amount of the rotation manipulated variable $\uparrow\Delta\theta$.

In this case, all the contacting portions (13, 23) to be brought into contact with an external object are rotated about the desired ZMP by the same rotational amount ($\uparrow\Delta\theta$). This ensures that the relative relationships in position and posture among all the contacting portions (13, 23) to be brought into contact with an external object remain unchanged before and after the correction of the desired positions/postures.

It is therefore possible to correct the desired position/posture of each contacting portion (13 or 23) to be brought into contact with an external object, such that an external force moment indicated by the moment manipulated variable $\uparrow\tau\_dmd$ may be added to the robot 1, while maintaining the relative relationships in position and posture among all the contacting portions (13, 23) to be brought into contact with an external object as the relationships defined by the reference operational goal.

For example, it is assumed that in the operational state of the robot 1 shown by way of example in FIG. 4A, the moment manipulated variable ↑τ_dmd has been calculated as illustrated in the figure.

FIG. 4A illustrates, by way of example, the robot 1 in the state where its feet 13R, 13L and hand 23R, serving as the contacting portions to be brought into contact with an external object, are in contact with (or landed on) the stepped floor surface (external object) indicated by the broken line Sa, in the reference operational goal.

In FIG. 4A, ↑rc_1, ↑rc_2, and ↑rc_3 represent a position vector of the contact point Pc_1 of the foot 13R, a position vector of the contact point Pc_2 of the foot 13L, and a position vector of the contact point Pc_3 of the hand 23R, respectively, observed from the desired ZMP.

In the situation illustrated in FIG. 4A, a rotation manipulated variable ↑Δθ is calculated so as to cause the position vectors ↑rc_1, ↑rc_2, and ↑rc_3 to be rotated about the desired ZMP in a direction (in the illustrated example, counterclockwise direction) opposite to the direction of the moment manipulated variable ↑τ_dmd.

Figure 4B:
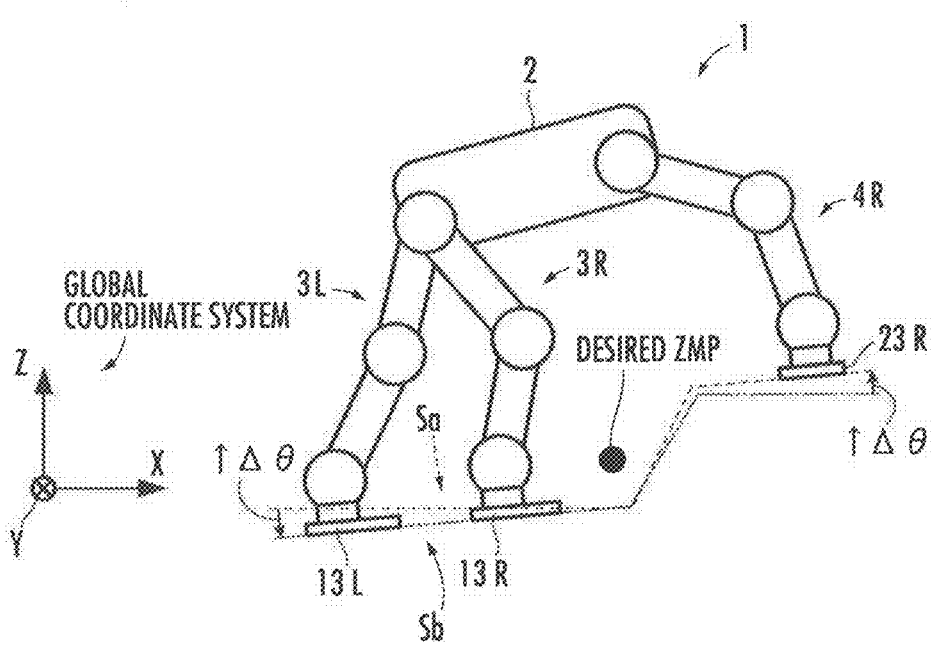

The robot 1 in the state where the desired positions/postures of the feet 13R, 13L and hand 23R have been corrected in accordance with the rotation manipulated variable ↑Δθ is illustrated in FIG. 4B. In this case, as shown in FIGS. 4A and 4B, the relative relationships in position and posture among the feet 13R, 13L and hand 23R as the contacting portions to be brought into contact with an external object remain unchanged before correction (FIG. 4A) and after correction (FIG. 4B). In FIG. 4B, the double-dot-dash line Sb indicates a virtual floor surface obtained by rotating the floor surface Sa about the desired ZMP by the rotational amount ↑Δθ.

Further, in the example shown in FIG. 4B, the desired positions/postures of the feet 13R, 13L and hand 23R are corrected such that the force with which the feet 13R, 13L were supposed to be pressed against the floor surface Sa in the reference operational goal are further increased, and such that the force with which the hand 23R was supposed to be pressed against the floor surface Sa is reduced. In this manner, the desired positions/postures of the feet 13R, 13L and hand 23R are corrected such that the moment indicated by the moment manipulated variable ↑τ_dmd is added to the robot 1 about the desired ZMP.

The control device 40, in each control processing cycle, performs the processing in the joint actuator controlling section 53 using a corrected operational goal obtained as a result of the above-described correction processing in the operational goal correcting section 52.

The joint actuator controlling section 53 sequentially determines a desired displacement amount (desired value of the rotational angle) of each joint (element joint) of the robot 1, by arithmetic processing of inverse kinematics of the robot 1, from the desired position/posture of the body 2, the desired position/posture of each foot 13, the desired position/posture of each hand 23, and the desired posture of the head 5 (relative to the body 2) in the corrected operational goal obtained by the operational goal correcting section 52.

The joint actuator controlling section 53 then performs feedback control of the joint actuators 41 so as to cause the actual displacement amount of each joint (value detected by the corresponding joint displacement sensor 43) to agree with the desired displacement amount. This enables the robot 1 to operate in accordance with the corrected operational goal.

In the present embodiment, the control processing by the control device 40 is carried out in the above-described manner.

According to the present embodiment, the desired position/posture of each contacting portion (13 or 23) to be brought into contact with an external object is corrected as appropriate from the desired position/posture in the reference operational goal, in such a manner that an external force moment, indicated by the moment manipulated variable ↑τ_dmd, for preventing the actual posture of the body 2 and the actual moment about the desired ZMP from deviating from their desired values in the reference operational goal will act on the robot 1.

In this case, the correction is carried out such that the relative relationships in position and posture among all the contacting portions (13, 23) to be brought into contact with an external object remain unchanged from the relationships in the reference operational goal.

It is therefore possible to implement the traveling operation of the robot 1 in such a manner that the actual motion pattern of each movable link 3 or 4 to be brought into contact with an external object during the traveling of the robot 1 is continuously maintained at, or close to, an optimal motion pattern that has been planned in the reference operational goal, irrespective of the number of the movable links 3, 4 to be brought into contact with an external object.

This can prevent the operational state of the robot 1 from becoming an operational state in which interference between the movable links 3, 4 and the like would likely occur, or from becoming an operational state having a low margin of keeping stability in posture of the robot 1, irrespective of the number of the movable links 3, 4 to be brought into contact with an external object. It is therefore possible to avoid an occurrence of a situation where continuous traveling of the robot 1 becomes difficult.

In the present embodiment, the value of the variable K_i for use in calculating the rotation manipulated variable ↑Δθ by the expression (8) is set such that the value gradually changes from one to the other of "1" and "0" while the i-th contacting portion is switched from one to the other of the state in contact with and the state not in contact with an external object, With this configuration, the rotation manipulated variable ↑Δθ can be calculated so as not to make discontinuous changes. As a result, the desired position/posture of each contacting portion 13 or 23 to be brought into contact with an external object can be corrected smoothly. This can enhance the stability in operation of the robot 1.

The embodiment was described above by giving as an example the robot 1 having two leg links 3R, 3L and two arm links 4R, 4L as the movable links. The mobile robot in the present invention, however, may be a robot having three or more leg links as the movable links, or may be a robot having no arm link.

Further, in the above embodiment, the posture of the body 2 and the moment about the desired ZMP were used as the state quantities of the robot 1 to be referred to for determining the moment manipulated variable ↑τ_dmd. Alternatively, the moment manipulated variable ↑τ_dmd may be determined in accordance with only one of these state quantities.

Still alternatively, the moment manipulated variable ↑τ_dmd may be determined in accordance with a state quantity other than the posture of the body 2 and the moment about the desired ZMP, which may be, for example, the position of the overall center of gravity of the robot 1, the posture of an arm link carrying and supporting an object, etc.

The state quantity/ies to be referred to for determining the moment manipulated variable ↑τ_dmd may be chosen as appropriate in accordance with the types of jobs performed by the robot 1.

Further, the contacting portion of each movable link 3 or 4 of the robot 1 is not limited to the tip end of the movable link 3 or 4. For example, the contacting portion of each movable link 3 or 4 may be an intermediate portion of the movable link 3 or 4, which may be, for example, the knee of a leg link 3 or the elbow of an arm link 4 or the like.

What is claimed is:

1. A control device for a mobile robot having a plurality of movable links extended from a body, each movable link being configured to move with respect to the body by an action of one or more joints disposed between a distal end of the movable link and the body, the mobile robot moving with a motion including an operation in which one or more movable links are moved in the air, not in contact with an external object, and a succeeding operation in which contacting portions as predetermined sites of the respective movable links are brought into contact with the external object, the control device comprising:

a moment manipulated variable determination section which, in accordance with a deviation between a desired value of a predetermined state quantity defined by an operational goal for the mobile robot and an observed value of the state quantity, determines a moment manipulated variable representing an external force moment to be added to the mobile robot so as to cause the deviation to approach zero;

a rotation manipulated variable determination section which, in accordance with the moment manipulated variable, determines a rotation manipulated variable representing a rotational amount by which position vectors, observed from a desired ZMP defined by the operational goal, of contact points between the external object and the contacting portions of respective contacting movable links, which are the one or more movable links among the plurality of movable links that are brought into contact with the external object, are to be rotated about the desired ZMP, the rotation manipulated variable being common to the respective contacting portions of all the contacting movable links;

a contacting portion position/posture correcting section which corrects a desired position/posture before correction, being a desired position/posture in the operational goal, of each of the contacting portions of the contacting movable links in accordance with a correction amount of the position/posture of that contacting portion, the correction amount including a translational displacement amount of the contacting portion produced when the contacting portion is rotated about the desired ZMP by the rotational amount indicated by the rotation manipulated variable from the desired position/posture before correction, the correction amount also including the rotational amount; and an actuator controlling section which determines a desired displacement amount for each joint of the mobile robot so as to implement a corrected desired position/posture of each contacting portion obtained by the contacting portion position/posture correcting section, and controls an actuator that drives the corresponding joint in accordance with the desired displacement amount;

wherein the rotation manipulated variable determination section is configured to determine the rotation manipulated variable by linearly converting the moment manipulated variable by a coefficient matrix such that a moment produced about the desired ZMP by an elastic rotational force produced along with rotation in posture of each contacting portion and an elastic translational force produced along with translational displacement of each contacting portion agrees with the moment manipulated variable, the coefficient matrix being determined from the position vector of the contact point of each contacting portion determined from the desired position/posture before correction of the contacting portion and the desired ZMP, a predetermined set value for a degree of stiffness of each contacting portion related to the rotation in posture of the contacting portion, and a predetermined set value for a degree of stiffness of each contacting portion related to the translational displacement of the contacting portion.

2. The control device for the mobile robot according to claim 1, wherein the rotation manipulated variable determination section is configured to determine the coefficient matrix by a following expression (A):

$$\text{Coefficient matrix} = \left[ \sum_{i=1}^{N} K\_i \cdot (K\tau\_i + (\uparrow rc\_i^T \cdot \uparrow rc\_i \cdot I3 - \uparrow rc\_i \cdot \uparrow rc\_i^T) \cdot Kf\_i) \right]^{-1} \quad (A)$$

where

N is a total number of the movable links, i is an identification number of the contacting portion of each movable link, $K\tau\_i$ is a set value for the degree of stiffness related to the rotation in posture of an i-th contacting portion, $Kf\_i$ is a set value for the degree of stiffness related to the translational displacement of the i-th contacting portion, $\uparrow rc\_i$ is a position vector of the i-th contacting portion observed from the desired ZMP, I3 is an identity matrix, and $K\_i$ is a variable which takes "1" in a contact state of the i-th contacting portion, takes "0" in a non-contact state of the i-th contacting portion, and takes a value that changes gradually from one value to the other value of "1" and "0" during a transition of the i-th contacting portion from one to the other of the contact state and the non-contact state.

3. The control device for the mobile robot according to claim 1, wherein the predetermined state quantity includes at least one of a posture of the body and a moment produced about the desired ZMP.

4. The control device for the mobile robot according to claim 1, wherein when a position in an X-axis direction, a position in a Y-axis direction, and a position in a Z-axis direction of the desired ZMP observed in a global coordinate system having two horizontal axes orthogonal to each other as an X axis and a Y axis and a vertical axis as a Z axis are denoted as Pzmp[X], Pzmp[Y], and Pzmp[Z], respectively, the desired ZMP is a position determined by the following expressions (1a), (1b), and (1c):

$$Pzmp[Z] = \frac{\sum_{i=1}^{N} Pcop\_i[Z] \cdot F\_i[Z]}{\sum_{i=1}^{N} F\_i[Z]} \quad (1a)$$

-continued $$Pzmp[X] = \frac{-Ma[Y] - (Pg[Z] - Pzmp[Z]) \cdot Fa[X] + Pg[X] \cdot Fa[Z]}{Fa[Z]} \quad (1b)$$

$$Pzmp[Y] = \frac{Ma[X] - (Pg[Z] - Pzmp[Z]) \cdot Fa[Y] + Pg[Y] \cdot Fa[Z]}{Fa[Z]} \quad (1c)$$

where

N is a total number of the movable links, i is an identification number of the contacting portion of each movable link, Pcop_i[Z] is a position in the Z-axis direction of a desired position of a contact point of the contacting portion of the i-th movable link with an external object, F_i[Z] is a desired value of a component in the Z-axis direction of a contact reaction force acting on the contacting portion of the i-th movable link from the external object, Pg[Z], Pg[X], and Pg[Y] are a position in the Z-axis direction, a position in the X-axis direction, and a position in the Y-axis direction, respectively, of a desired position of an overall center of gravity of the mobile robot, Ma[X] and Ma[Y] are a component in a direction about the X axis and a component in a direction about the Y axis, respectively, of a moment that is produced about the overall center of gravity of the mobile robot by a resultant force of a gravitational force acting on the mobile robot and an inertial force produced by a desired motion of the entire mobile robot defined by the operational goal, and Fa[X], Fa[Y], and Fa[Z] are a component in the X-axis direction, a component in the Y-axis direction, and a component in the Z-axis direction, respectively, of a translational force constituting part of the resultant force of the gravitational force acting on the mobile robot and the inertial force produced by the desired motion of the entire mobile robot defined by the operational goal.

* * * * *